United States Patent [19]

Purchase

[11] 4,207,524
[45] Jun. 10, 1980

[54] RADIO COUPLED DEVICE FOR DETECTING AND ANALYZING WEAK TRANSMISSIONS

[76] Inventor: Francis J. Purchase, 130 Columbia St. W., Waterloo, Ontario, Canada

[21] Appl. No.: 863,851

[22] Filed: Dec. 23, 1977

[51] Int. Cl.² .............................................. H04B 1/12
[52] U.S. Cl. ................................... 375/22; 340/167 A; 375/34; 375/96
[58] Field of Search ...................... 340/167 A, 167 R; 325/38 R, 42, 55, 64, 65, 302, 321, 323

[56] References Cited

U.S. PATENT DOCUMENTS

| | | | |
|---|---|---|---|
| 3,510,777 | 5/1970 | Gordon | 325/55 |
| 3,852,713 | 12/1974 | Roberts | 340/167 A |
| 3,906,348 | 9/1975 | Willmott | 325/55 |
| 4,006,462 | 2/1977 | Podowski | 340/167 A |
| 4,020,477 | 4/1977 | Holland | 340/167 R |
| 4,095,211 | 6/1978 | Shaughnessy | 325/55 |

FOREIGN PATENT DOCUMENTS

424216  9/1974  U.S.S.R. ............................... 340/167 R

*Primary Examiner*—Robert L. Griffin
*Assistant Examiner*—Michael A. Masinick

[57] ABSTRACT

A signalling device employing radio frequencies in which the transmitter produces a weak, or relatively weak, encoded transmission within a crowded frequency band and an associated receiver which includes a processor capable of detecting and analyzing the weak signal by applying significance to each signal parameter including pulse width, word length, pulse characteristic, number of bits; and, imposing the further requirement that the same parameters must be perceived a second time within a prescribed 0.2–0.8 sec. interval to insure that the signal has been produced by a correctly encoded transmitter and not by a mere random reception. It is a characteristic of the signal processor that it search the received transmission, digitally analyze the encoded signal notwithstanding high noise/signal ratio, and detect the presence of the encoded signal, and then operate a system after having authenticated a transmission and reception of the encoded signal by requiring a second detection of the encoded signal within a prescribed time. In this way, the system is free of spurious actuations arising from mere random duplication of the encoded signal.

7 Claims, 10 Drawing Figures

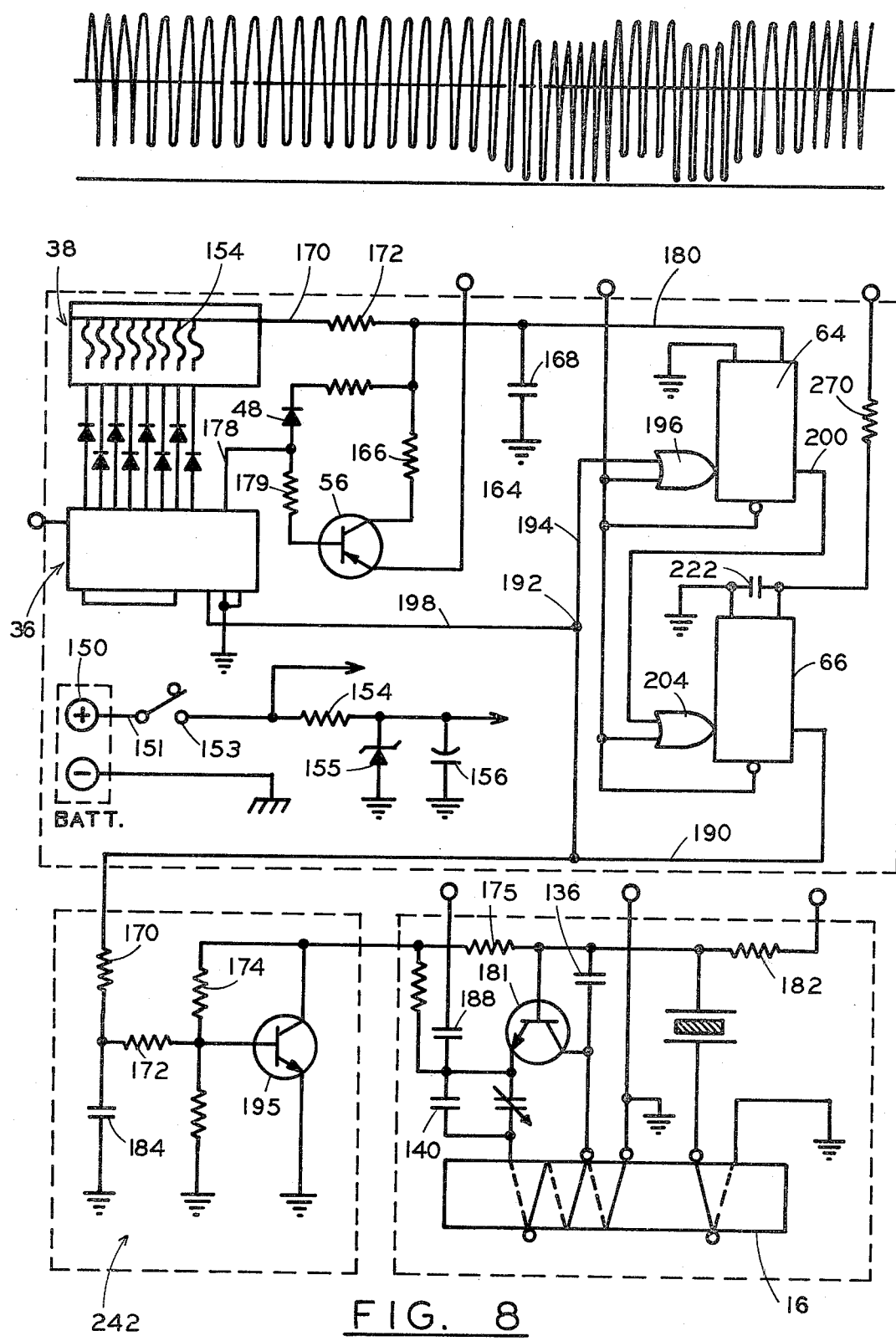

4,207,524

RADIO COUPLED DEVICE FOR DETECTING AND ANALYZING WEAK TRANSMISSIONS

BACKGROUND ART

A transmitter-receiver combination utilizing radio frequency coupling has frequently been proposed for operating and controlling various systems, such as alarms for detecting burglaries, fires, thefts, and the like. Equally, such systems are useful for monitoring liquid levels in tank farms, medical dysfunctions, interoffice communications, and other such applications. Unfortunately, the range of such equipment, until now, has been seriously limited because, when the transmitter or receiver is personally carried, the transmission power is small, and thus the signal is quite weak. Added to this, if the frequency band used obviates the necessity for license, the band has a high density of background noise in combination with the encoded signal. Thus, a relatively weak signal and a low ratio of signal to noise, make it difficult to amplify, detect the presence of, and analyze, an encoded signal in any practical way of coupling a transmitter to a receiver over any appreciable distance, such as 1,000 feet or so using equipment of a reasonable cost.

In other words, the cost effectiveness of a radio system in which there are relatively weak signals, transmitted in a crowded frequency band, has been thus far beyond the capability and understanding of the art.

While some radio frequency coupling devices have been proposed, their range is substantially limited, or they require, in Canada, a Communications Canada license. What is required is a radio transmission control device which does not require a licsense to operate; is extremely sensitive to achieve the necessary range; but whose sensitivity is not defeated by background noise which tends to obscure relatively weak signals, particularly when the signal is greatly amplified.

DISCLOSURE OF INVENTION

The present invention proposes to utilize a digital system, capable of receiving and processing a greatly amplified weak signal together with its accompanying noise, and then analyzing the amplified signal by applying all available test parameters to detect the encoded signal, including pulse width, word length, pulse characteristics and number of bits per word. Having then searched the incoming signal for the critical signal characteristics and compared them with a digitally encoded memory signal corresponding to the one which is being searched for in the transmitted amplified signal information, and having detected the presence of such key characteristics, the procedure is then repeated. If there should occur a second encoded signal of the prescribed pulse width, word length, pulse characteristics and prescribed number of bits per word, and if recurrence of the encoded signal should be detected within a prescribed period of time, in the order of 0.2 to 0.8 seconds, the processor part of the system will then energize a controller which operates a further system, such as an alarm (visual or audible); a dialer and telephone coupling having a received message to summon aid; an automobile starter, or any other end system which is desired to be remotely operated.

It is possible to utilize a relatively weak signal with a transmission length of 1,000 feet or so, and the signal can occur within a crowded frequency band and tolerate relatively high amplification at the receiver because of the novel signal processor. The signal processor extracts and digitally analyzes all of the possible information in the incoming signal. The processor, having satisfied the requirement that all of the characteristics of the encoded signal have been detected, compares them with an encoded memory signal within the receiver. If the processor detects a second encoded signal within the time span of 0.2–0.8 seconds, this time span being of arbitrary length, this insures that the signal processor is not responsive to merely a chance, random signal corresponding to the target signal; the receiver will operate a responsive system. This requirement is sometimes referred to herein as "repeatabilty", and such requirement makes it possible to combine a sensitive receiver with a weak transmitted signal in a crowded frequency band, and yet inadvertent operation by accidental occurrence of the encoded signal is precluded.

The transmitter in this proposed system has a changeable, or adjustable, encoder which is adapted to transmit a signal matched with the signal in the memory system of the receiver, the transmitter containing both a trigger and a self-contained power system for emitting the signal on demand, of the prescribed pulse width, word length, pulse characteristic and bits, all of which are reproduced at the receiver and compared with the memory signal and thereby effecting the RF coupling.

It is characteristic of the transmitter (including the encoder) and the receiver (including the processor) that these devices are constructed from readily available components and that such components are adjustable to provide unique signals, one for each transmitter-receiver combination so that they transmit and receive encoded signals in complementary relation. The signal transmitter and receiver are matched and are thereby capable of personal or individual use.

Other features and objects of the invention will become apparent from a consideration of the following description which proceeds with reference to the drawings, in which an example embodiment of the invention is described by way of example and not by way of limitation.

BRIEF DESCRIPTION OF DRAWINGS

FIG. 7 illustrates a highly amplified random signal noise type showing a displacement of this noise in the presence of a weak digital type transmission;

FIG. 8 is a schematic diagram of the transmitter including the encoder section;

BEST MODE OF CARRYING OUT THE INVENTION

Figure 1:
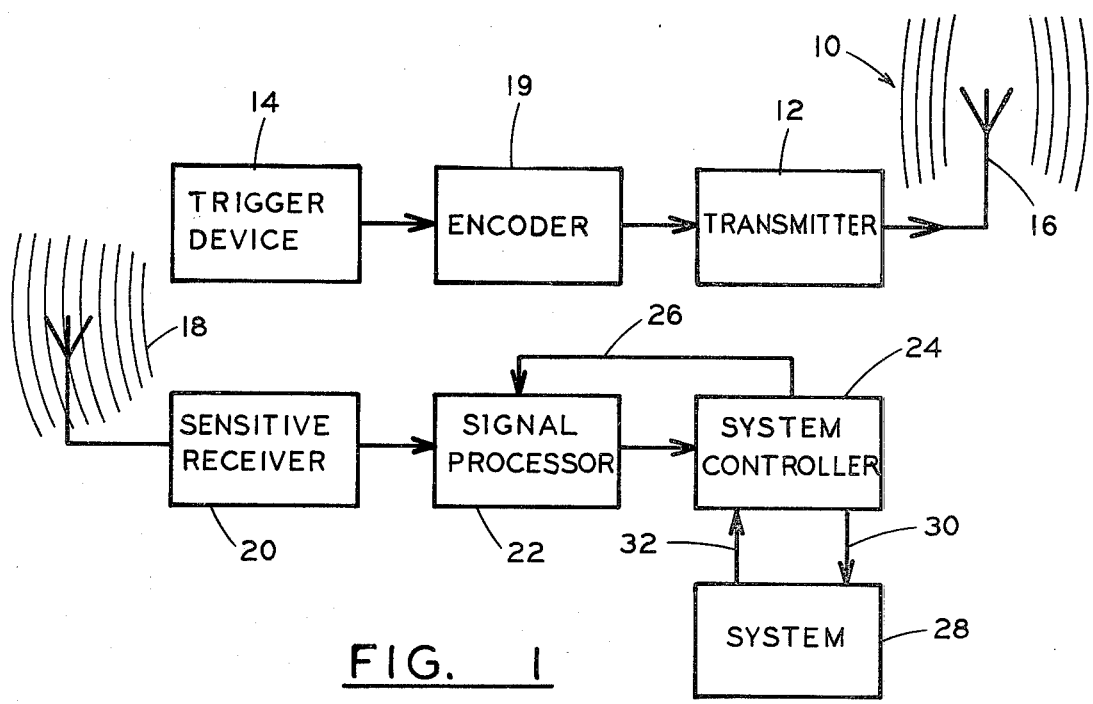
FIG. 1 is a block diagram of the radio system illustrating the transmitter and receiver which operates a particularly selected system.

Referring to FIG. 1, an RF coupled system designated generally by reference numeral 10 includes a portable, self-contained power system transmitter 12 having a trigger device 14, an antenna 16, and encoder 17, which is coupled by RF signals 18 to a high sensitivity receiver device 20 having an amplifier.

Amplified signal from the receiver 20 is transmitted to a signal processor 22 and from there to a system controller 24 having a feed-back 26. The system controller 24 is connected to a system 28 such as a car starter, alarm (either visual or audible), a gauge which measures quantity of fluid such as oil or the like, or any other system intended to be remotely controlled by a transmitter 12. The system 28 both receives signals as indicated by 30 and has a feed-back 32 to the system controller signalling the readiness or unreadiness of the system for actuation by the system controller.

Figure 2:
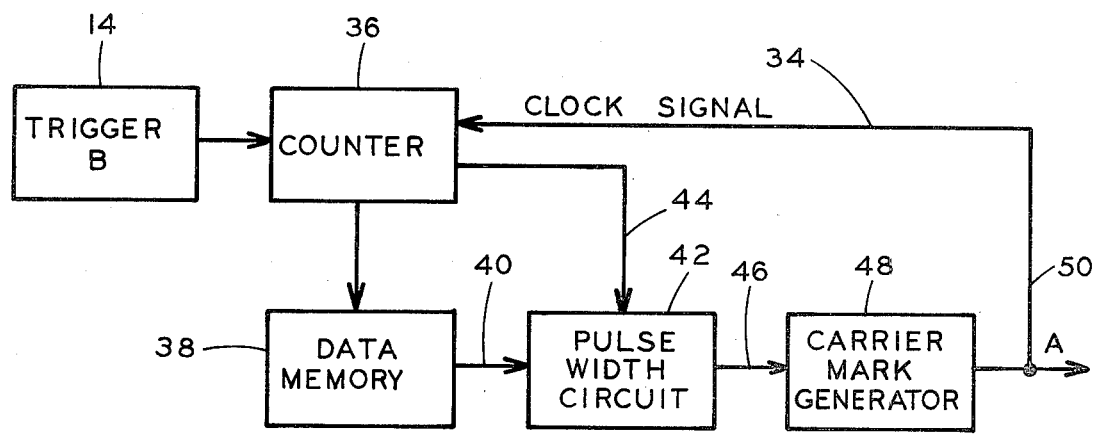
FIG. 2 is a block diagram of the transmitter coding system.

Referring to FIG. 2, the transmitter 12 includes a clock signal 34 and counter 36 controlled by trigger 14, counter 36 being connected with data memory programmable shunt 38 which determines through conductor 40 a "0" or "1" pluse which feeds into a pulse width circuit 42. The counter 36 also connects through conductor 44 with pulse width circuit 42 in order to generate the correct end of data pulse (sometimes referred to as "word length"). The "1" or "0" series of bits together with the pulse width circuit and "word length" circuit, is then transmitted through conductor 46 to a carrier mark generator 48 which then separates the "1" and "0" pulses to make the wave form in an 8-bit, or whatever combination bit wave form is desired, determined by the data memory which consists of a series of programmable shunt circuits establishing the sequence, occurrence, and pattern of "0" and "1" pulses, or bits, which form the complete word. At the end of the word length (in the order of 35-45 milliseconds), the signal is then repeated. The system is operated so that there is a time separation between each word before the next signal is repeated.

Details of the encoder are illustrated in FIGS. 2 and 8.

Figure 3:
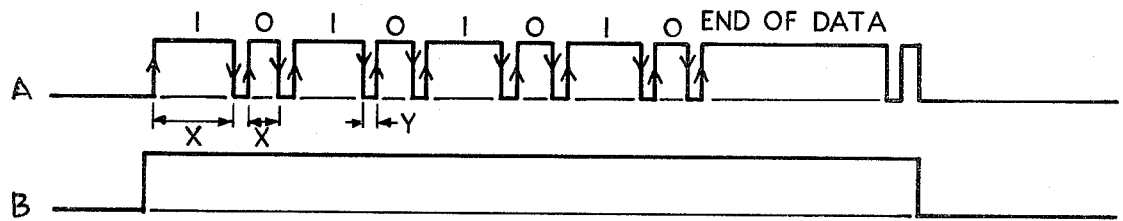
FIG. 3 shows the typical modulation wave forms generated and communicated to the transmitter with the data in the form of encoded "1" and "0" bits.

Referring to the wave form A and B (FIG. 3), the data memory determines the occurrence, sequence and number of "1" and "0" bits. FIG. 3, Line A, for example, consists of an 8-bit signal of alternating "1" and "0" bits followed by an "end of data" bit, this form being derived from memory 38. The pulse width "X" for these bits, whether "1" or "0", is determined from pulse width circuit 42 and the bit separation "Y" is the mark point, derived from carrier mark generator 48.

Figure 4:
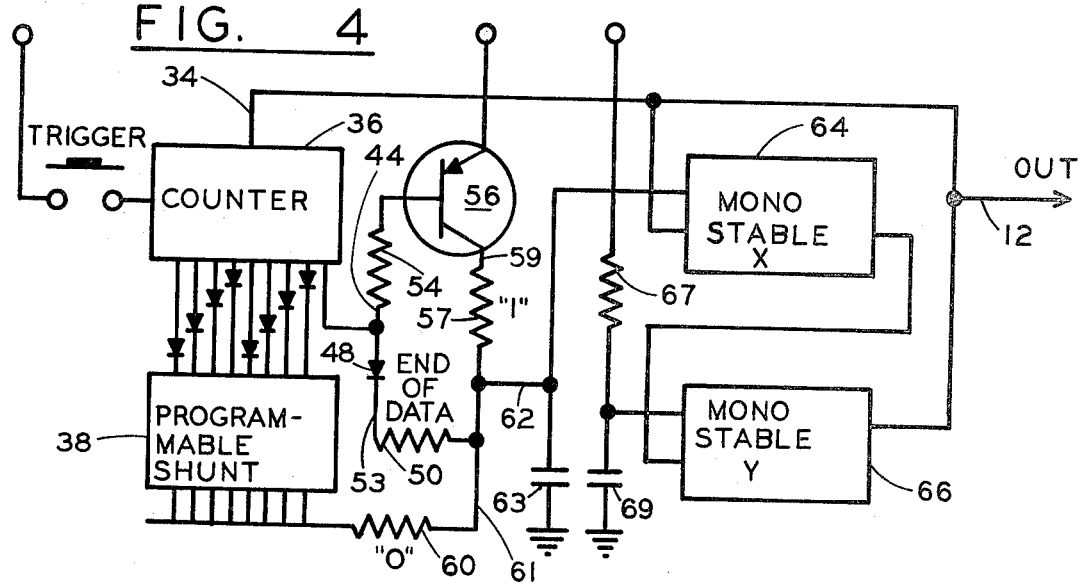
FIG. 4 is a schematic diagram of electrical components in which a signal is encoded and is then transmitted to a receiver in the form of digitally analyzable RF signal.

Referring to FIGS. 2 and 4, a clock signal via conductor 34 connects with counter 36 leading to a programmable shunt 38 (data memory), each with a series of switches 1 through 8 corresponding to the bits and bit positions of the wave form. The counter 36 is also connected through conductor 53 to resistor 50 for the purpose of generating an "end of data" pulse at the end of each repeated word. When there is no other current charging capacitor 63, the system assumes a "1" and acts through a PNP transistor 56 which acts as a switch enabling a circuit through conductor 59 and resistance 57 to capacitor 63 and this conditions a monostable 64 to develop a "1" pulse.

To develop a "0" pulse, the counter 36 accesses the programmable shunt 38, thus causing capacitor 63 to be charged through 60 via conductor 61 in parallel with resistor 57 and conductor 59 and transistor 56, thus conditioning the monostable 64 to produce a "0" or short pulse when triggered.

To develop an "end of data" pulse, counter 36 accesses diode 48 and conductor 44. The signal through resistor 54 operates the transistor switch 56. Signal through diode 48 and conductor 53 charges capacitor 63 through resistor 50, thus conditioning monostable X 64 to produce a long or end of data pulse when triggered.

The triggering occurs at the end of a carrier mark pulse from monostable Y 66. This mark pulse from 66 started at the end of "0", "1", or "end of data" pulse, therefore these two monostables trigger each other in closed loop systems. The monostables address each other.

The "0" or "1" bit signal is transmitted through conductor 61, junction 62 with capacitor 63 and a dual monostable flip-flop consisting of monostable 64, constituting the variable width for the "0" and "1" pulses or bits (see wave form, FIG. 3) and the interval monostable 66 determines "Y" displacement (FIG. 3, "Y"). Thus, the wave form characteristics, including the number of bits, pulse width, wave form characteristics, and word length, is defined by these few components, all of which are commercially available and are connected in this novel manner to provide a preselected, programmable or adjustable wave form communicated to the transmitter 12.

Typically, the wave form is such that the "1" bit has a pulse width of 25 to 30 milliseconds, the "0" bit is approximately 10 milliseconds, and the "end of data" wave form has a pulse width of approximately 35 to 45 milliseconds. The interval monostable 66 has a resistor 67 and capacitor 69 to produce a carrier mark pulse typically of 5 milliseconds. The monostables 64,66 correspond to 42 and 48 in the block diagram FIG. 2.

The transmitter 12 and encoder 17 transmit a precise wave form which is amplified and detected by the receiver 20 and is digitally analyzed by the signal processor 22, FIG. 1, having a data memory 70 (FIG. 5), which recognizes a wave form of the same characteristics as the wave form developed by the encoder 17 in the transmitter 12. The transmitter encoder (FIG. 4) is adjusted through the programmable shunt 38. Such signal is correspondingly programmed within the data memory 70 of the signal processor 22.

The encoded signal from the transmitter 12 is inherently a weak signal. In order to get a satisfactory range with low transmission power, the receiver 20 must be extremely sensitive. The receiver device 20 does meet the functional requirements of being able to receive the signal even when transmitted under low transmission power and even when accompanied by substantial background noise. Typically, the received signal has a random wave form of the type indicated in FIG. 7, in which the encoded signal is virtually lost in the background noise. Nevertheless, it is possible to receive, amplify, and detect the encoded signal even where the signal to noise ratio is as low as 1:3 by measuring the displacement.

It is one of the characteristics of the receiver device 20 and signal processor 22 that the system controller 24 (FIG. 1) does not actuate the system 28 because of a random matching of an incoming or received signal with the stored or memory signal to produce an inadvertent operation. All such inadvertent operations are obviated by a verifying or "authentication" portion of the signal processor which, together with the other elements of the receiver, will next be described.

Figure 5:
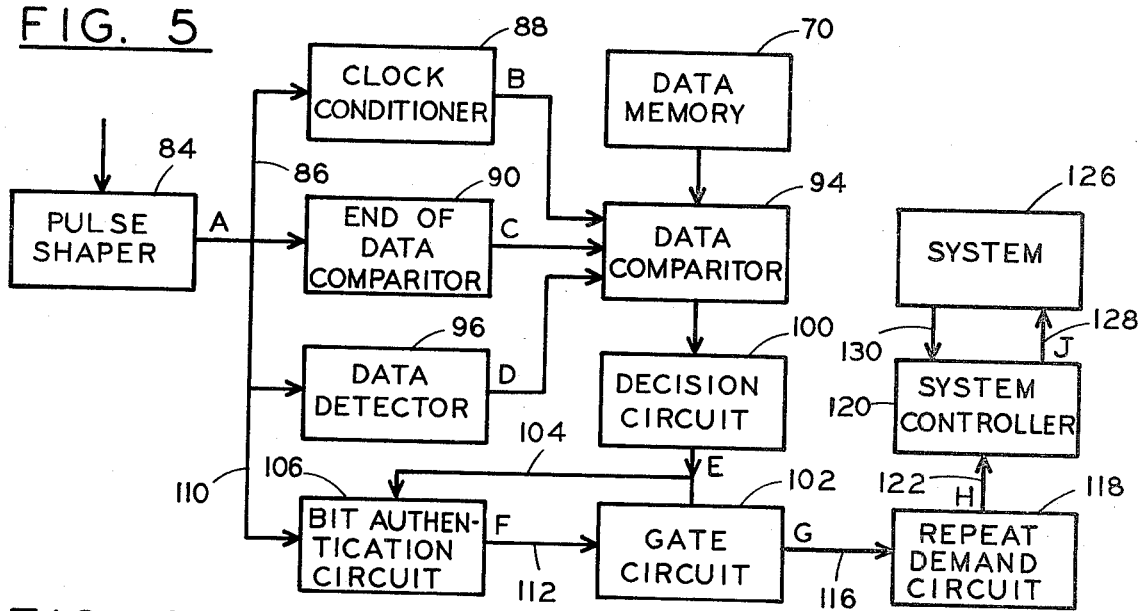
FIG. 5 is a block diagram of the signal processor.

Referring to FIG. 5, incoming signals from the receiver 20 are first amplified even though in conventional devices this would accentuate the problem of detecting and processing a particular encoded signal. After the signal is amplified in the receiver device 20, it is transmitted to a pulse shaper 84 which "squares up" the signal. The shaped signal from conductor 86 labeled "A" wave form (FIG. 6) may contain the encoded signal developed by the transmitter 12 if it has a wave form, as illustrated by line A, FIG. 6.

From conductor 86 there is a reconstruction of the transmittable information using a combination of clock conditioner 88, an end of data comparitor 90, data detector 96 and bit authentication circuit 106.

Taking these in turn, the clock conditioner 88 develops spike pulses which are supplied to the data comparator 94. The data memory 70 furnishes the encoded signal parameters and the data comparator lines the two together so that the decision circuit 100 can make its decision.

Figure 6:
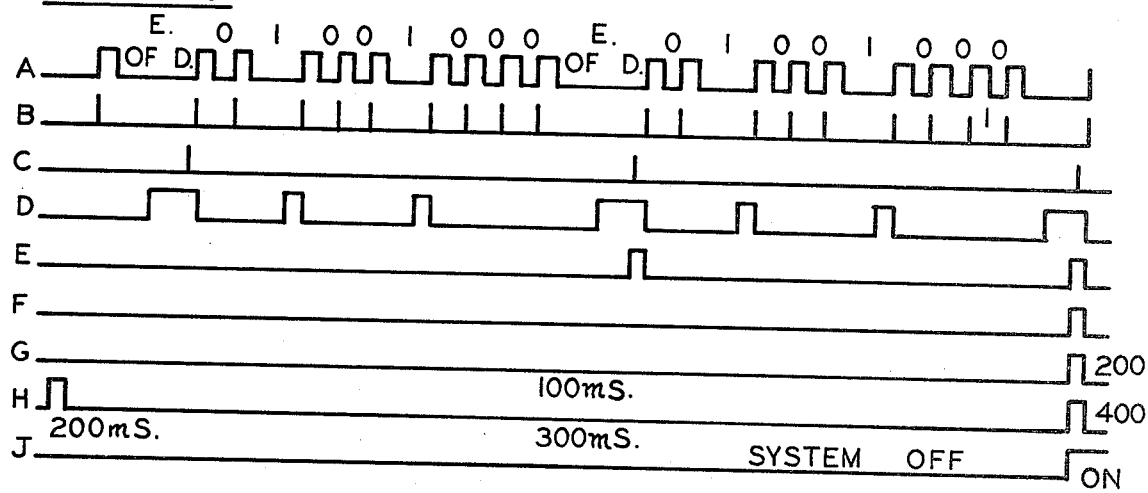
FIG. 6 illustrates a timing diagram of the signal processor.

The received signal is also tested for the presence of a data "word", or time interval for transmission of a complete word, this being the function of end of data comparitor measuring device 90 having two displaced spike wave forms indicated by line C of FIG. 6. Finally, there is a reconstructed data detect signal which tests the incoming signal for the presence of a wave form indicated by line D of FIG. 6, this feature measuring the wave characteristic, i.e., the sequence in occurrences of "0" and "1" bit pulses. The clock conditioner 88, word length (end of data) comparitor 90, and data detector 96, develop wave forms B, C. and D corresponding to pulse width, word length and pulse characteristics. These testing devices develop, in effect, a reconstruction of transmittable information which next feeds to a data comparator 94 at which point data memory 70 supplies the characteristics for the encoded signal, and these are compared with wave forms B, C, and D; and, if they correspond, this is taken as an encoded signal detection. Such detection is communicated to a decision circuit 100 which makes the decision of correspondence between the incoming signal and the memory.

The occurrence of data memory 70 corresponding with the reconstructed transmitted information causes a pulse from the decision circuit 100 corresponding with Line E, FIG. 6. The pulse of line E is communicated to a gate 102. Simultaneously, the decision circuit 100 acts through a branch conductor 104 to a bit authentication circuit 106, which also receives a signal corresponding to line E. If there is a correct number of bits (in this case, 8 bits) in the transmitted signal (see line A communicating to 106 through conductor 110), then bit authentication circuit 106 will produce a pulse line "F". The pulse "F" is transmitted through 112 to gate 102. Pulse "F" occurs only at the end of the second "word" (see line "F", FIG. 6). When the repeat demand circuit 118 receives two such pulses from line "G" in conductor 116 over a time interval in the order of 0.2 to 0.8 seconds, it will signal an actuation pulse, line "H", to the system controller 120, which then operates system 126 by a pulse, line "J".

The system is not responsive to any at-random signal, which would be a false indication that the transmitter 12 is sending an encoded signal. Instead, such false signals emanating from sources other than transmitter, are screened out by subjecting the encoded signal perception of two authentications and one repeat demand requiring the occurrence of a second set of encoded signals within a given time interval.

Should the repeat demand circuit 118 receive a second signal fully authenticated by a received second signal set corresponding to the signal in the data memoy 70, the repeat demand circuit 118 will then be energized to deliver an actuating pulse through conductor 122 (pulse line "H") to the system controller 120. System controller 120 then transmits a signal through conductor 128 (pulse line "J") to system 126.

If the actuating signal arrives at the system while the system is in condition to operate, i.e., a car starter, the system 126 will start the car, but only if the car has a charged battery, sufficient fuel, and starting efforts have not been continuous over extensive periods of time that could wear down the battery. The feed-back signal from line 130 determines if the system 126 will accept an energizing pulse from system controller 120 through conductor 128. Likewise, the system controller 120, once the car is running, receives a disabling return signal from conductor 130 so that any system controller signal from conductor 128 is no longer "heard".

It should be understood that the system controller 120 and system 126 is the interchangeable part of the apparatus. The system controller 120, system 126 can be substituted, and can be distinct components or combined as a single component. In the event of an alarm, this can be a visual signal, an audible signal, it can consist of an LED readout when it is desired to read the oil content in tank forms of various tanks. In the case of a medical alarm, it may include a coupling to a telephone with a multiplexer and stepping circuit adapted to make telephone calls and transmit messages to ambulances, physicians, hospitals and the like.

The foregoing occurs by reception of a relatively weak signal over a substantial transmitting distance, using a signalling device which does not require Communications Canada license. Moreover, the transmission occurs in a crowded frequency band where the encoded signal ratio to background noise is extremely low, in the order of 1:3, and amplification can occur with attendant noise amplification but without losing the detectable signal.

As explained, the system is not susceptible to false actuation by the random receiving of an encoded signal because the statistical likelihood of receiving a random signal corresponding to the encoded signal is not acted upon immediately but must be repeated to be made effective.

OPERATION OF THE INVENTION

In operation, transmitter 12 shown in FIGS. 1, 2 and 3, is operable on a demand basis by a trigger 14, either manually or remotely actuated. In the case of medical usage, the transmitter 12 operates to summon help, the transmission can be automatic responsively to an aberration in pulse rate, heart beat, electrocardiogram signal, or the like. In any of these arrangements, a signal of predetermined encoded characteristic is transmitted from the transmitter 12 through antenna 16 as indicated by RF transmission 18 (FIG. 1) to the receiver device 20. The receiver 20 amplifies the incoming signals and such signals are analyzed for the presence of the encoded signal and in the even such signal is present, it is tested for repeatability as shown in FIG. 4. The transmitter has a programmable shunt 38 and adjustable monostables 64,66 which determine the number of bits of the code, pulse width, pulse characteristic, and word length, these being the characteristics or parameters of the encoded signal.

Referring to FIG. 3, assuming there is an 8-bit signal to be transmitted, the counter steps successively through switches of programmable shunt 38. Whether the switch is open or closed determines a "0" or "1" signal. The order of the switches determines the pulse characteristics. After passing through junction 62, the signal then passes through a monostable 64 which determines the pulse width and a second monostable 66 imposes an adjustable marker for each bit so that each of the 8-bits is marked equally. Thus, referring to line A, FIG. 5, programmable shunt 38 determines the existence of a "0" or "1" bit, having a duration of, tpically, ten milliseconds for a "0", and 20 milliseconds for "1", and with 5 milliseconds for each marker or pause between bits.

At the ninth bit position in the programmable shunt, the ninth pulse or "bit" is transmitted through conductor 44 to a resistor 54, PNP transistor 56, diode resistor 58, rectifier 48 and resistor 50 in branch 53. The function of this part of the circuit is to determine the time interval which separates succesive words labeled "end of data", line "A", FIGS. 2,3.

The transmitter unit is powered by a battery. Line power can also be used if available; generally, however, the transmitter has a self-contained power unit, and is portable.

After the signal is encoded, it is communicated to the transmitter 12 and then to the antenna 16, where it is emitted as an RF transmission. The signal is repeated every 8 bits, and the transmission is continuous as long as the trigger 14 is depressed.

The shaped pulse from 84 is then communicated to the signal processor designated generally by reference number 22, (FIG. 1) line "A", FIG. 6.

After pulse shaping, the shaped signal is measured by a clock conditioner 88 which produces a spike at the occurrence of each bit, as shown in line "B", FIG. 6. The shaped pulse is also transmitted to "end of data detecting means" 90 also in the form of a gate to determine word length, line "C", FIG. 6, and pulse characteristic means data detector 96, which is also shown as a gate, and determines the sequence of "0" and "1" pulses, line "D", FIG. 6.

Data from the three gates 88,90, and 96, amounting to a reconstruction of the incoming signal (pulse parameters illustrated in lines B, C, and D of FIG. 6), are then communicated to the comparator 94 which makes a comparison of the components of the incoming signal with the data memory 70.

Should the data comparator 94 determine a correspondence between the encoded signal as it appears in the memory 70 and the pulse characteristics as noted by the clock conditioner 88, the end of the data comparator 90, and pulse characteristic data detector 96, then such is communicated to the decision circuit 100.

The pulse is next analyzed to determine if it has the correct number of bits by "bit authentication circuit" 106 and if that should occur, the gate 102 at the end of the second word, is pulsed (line "F", FIG. 6), and there is then initialized a repeat demand circuit designated generally by reference numeral 118. If a second authenticated signal is received by the repeat demand circuit 118 within a time span of 0.2 to 0.8 seconds, then a second pulse on line "G", FIG. 6, will energize the repeat demand circuit 118 which, in turn, will deliver pulse, line "H", and the system will be actuated by the system's controller 120. As described, the system will screen out the accidental or random receiving of a particular signal of the type being monitored for by the receiver. The system controller 120 will then proceed to operate the system 126 (FIG. 5).

Figure 9:
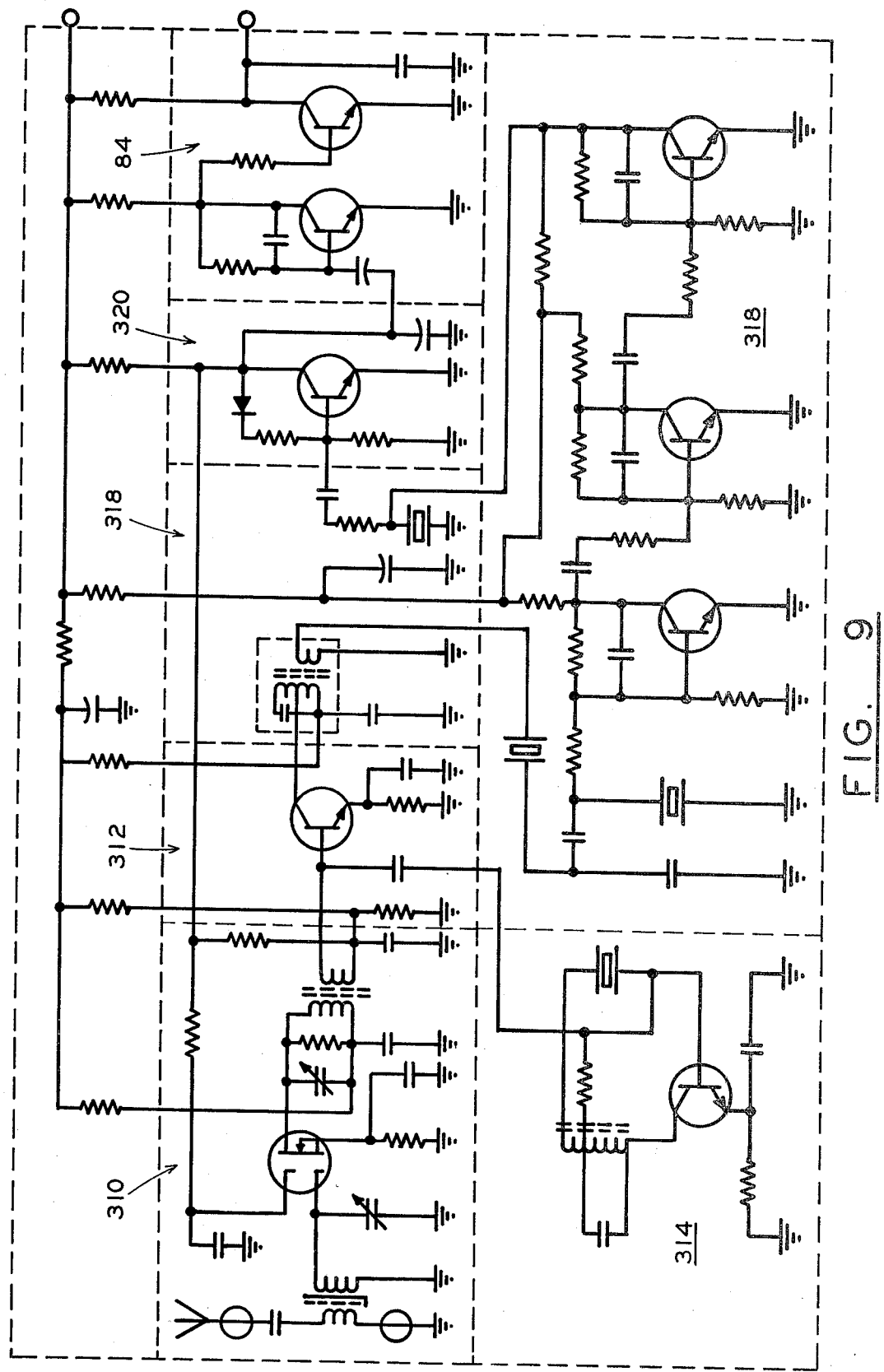
FIG. 9 is a schematic diagram of the receiver.
Figure 10:
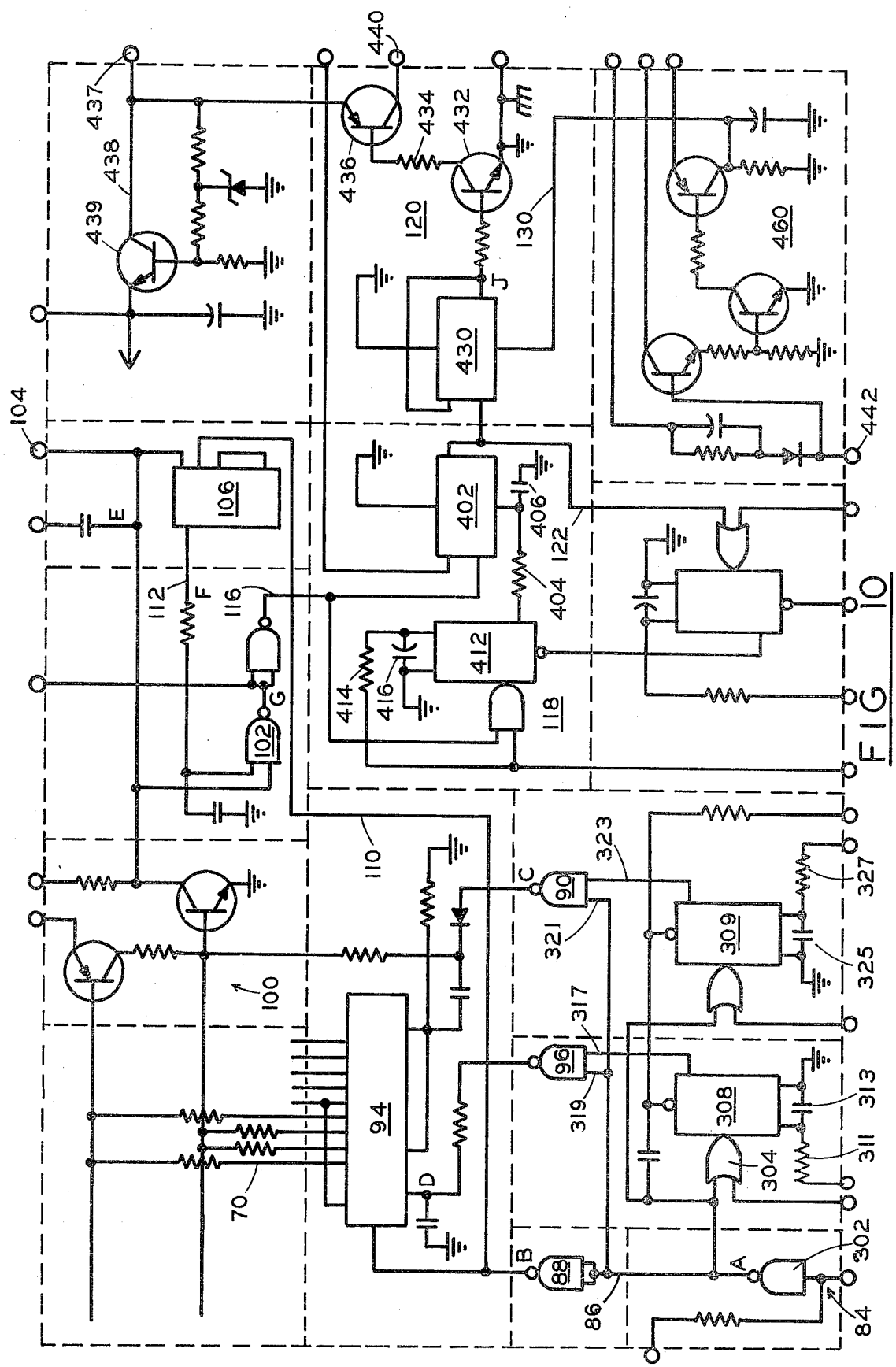
FIG. 10 is a schematic diagram of the signal processor.

For a further understanding of the system as described, the description is supplemented by the detailed circuit diagrams (FIGS. 8, 9, 10).

DETAILED CIRCUIT DIAGRAM DESCRIPTION

Referring to FIG. 8, there is disclosed in detail the transmitter including the encoder means.

The counter 36 together with programmable shunt 38 is utilized for encoding the signal, digitally, to produce "0", "1", and "end of data" configurations which form the wave signal. The method in which an "0" pulse is obtained is by first supplying a voltage from a voltage source such as a battery 150 through conductor 151, switch 153, resistor 154, zener diode 155, and capacitor 156 so that a stable power supply of 6.3 volts is communicated to all points marked "V."

Power is supplied to the counter 36 as indicated by the 6.3 positive terminal "V." and to the dual monostables 64,66 also indicated by the positive terminal labeled "V.". The voltage supply is stable and will maintain this voltage level regardless of fluctuations in the power source.

Once the unit is switched on, regardless of the condition of the circuit, the device, being essentially a series of closed loop oscillators, will commence to complete whatever pulse is in the process of generation, and will then proceed to count through and make a complete repeating wave form which has been preprogrammed by setting the switches interconnecting the counter 36 with the programmable shunt 38.

Considering first the generation of a "1" bit and starting from the extreme left-hand side of the counter, the switch is in "open" position between 36 and 38 and, because the switch is open, it will preclude a circuit being made through conductor 170 having resistance 172. Instead, a circuit will be made through conductor 160, PNP transistor 162, conductor 164, resistor 166 to capacitor 168. In following this circuit, a considerably greater time period is involved because resistor 166 is made greater than resistor 172, which is used in generating a "0" pulse.

Simultaneously with charging the capacitor, the signal is also communicated through conductor 180 to monostable 64 which has the effect of conditioning the monostable 64. The pulse will actually not be delivered until the monostable 64 is triggered by monostable 66, which acts through conductor 190, junction 192, conductor 194 to gate 196. The monostable 64 is preconditioned to deliver a "1" pulse by the capacitor 168-resistor 166 network. In other words, it is an "R-C" network which preconditions the monostable 64 and determines whether it will deliver a "1" or "0" or "end of data" pulse. The trigger, or servo loop, between monostable 66 and its connection to monostable 64 serves as the marker for the determination as to when the pulse is delivered.

Additionally, the monostable 66 delivers from conductor 190 through conductor 198 to the counter 36, the signal to step to the next bit position. Assuming that this next bit position is a "0", means that there is a closed switch between the counter 36 and the programmable shunt 38 and a circuit in this case is made from 36 through 38 to conductor 170, resisance 172, conductor 180, to the monostable 64. Since the resistance 172 in this case is much smaller by comparison with resistance 166, there is a short duration of signal communicated to monostable 64 conditioning it to deliver a "0" pulse when the monostable 64 is again triggered by the monostable 66 through conductor 190, junction 192, conductor 194 and gate 196.

The two monostables 64,66 thus serve as multivibrator oscillators which are stable in one state only and are triggered to another stage. Thus, the one monostable 64 is preconditioned to develop a "0", "1", or 37 end of data" signal, whereas the other monostable determines the markers for delivery of the pulses as illustrated in line "A", FIG. 3.

The monostable 64 triggers monostable 66 through a conductor 200 acting through gate 204 to the monostable 66. Thus, referring to the wave form line "A", FIG. 3, the upgoing edge of the wave form is determined by monostable 66 acting through the feed-back network inclusive of conductor 190, junction 192, conductor 194, gate 196, to monostable 64, the duration of the pulse in this case "1", "0" or "end of data", is determined by the R-C network conditioning the monostable 64, the downgoing edge of the signal is determined by the monostable 64. Once the monostable 64 returns to its stable state, monostable 66 is triggered through conductor 200 and gate 204. The duration between pulses, labeled "Y", line "A", FIG. 3, is determined by the R-C circuit inclusive of resistance 220, capacitor 222, appearing at the upper part of the monostable 66 in FIG. 8. This R-C circuit determines the duration separating successive bits which make up the wave form. This is also known as the carrier mark.

The described unique arrangement of monostables which are related to each other and to the counter-programmable shunt combination, is capable of effecting the necessary generation of wave form, and the wave form is readily programmable by control of the switches which are located between the shunt 38 and counter 36.

It should be noted that the two monostables 64,66 are utilized in relation to each other so that each furnishes a necessary trigger signalling the other and they are hence mutually servo-operated, with the one monostable serving in addition to triggering, or trickling, the other circuit, to step the system through the successive bits.

The described system is readily available from standard components and is yet capable of generating a substantial variety of wave forms for a particular transmission. Once the signal is generated, it is then communicated as an output through conductor 240 as a modulated signal. This modulated signal controls a transmitter modulator which is of standard construction and is designated generally by reference numeral 242.

The modulator, in turn, switches the R-F oscillator, which, again, is of a standard set of components, and arrangement of components, into on-and-off positions in accordance with the modulation encoding provided by the encoder at the left-hand portion of FIG. 8. That signal is then used in relation to a transmitting antenna 16 to effect an R-F coupling through a ferrite antenna with a sensitive receiver 20 which will next be described.

Referring to the receiver 20, FIG. 9, there is shown in block diagram surrounding the various circuit components, an R-F amplifier 310 which is coupled with a mixer 312. The local R-F oscillator 314 and the received signal from the R-F amplifier are then mixed in the mixer 312.

What then comes out of the mixer is a standard intermediate frequency of 455 kHz. This is then taken into the 455 kHz IF amplifier designated by reference numeral 318 and the greatly amplified signal then passes to the detector stage 320 and the subsequent modulated envelope stage from the detector stage, goes into the pulse shaper 84.

From the pulse shaper 84 the signal is then communicated to the signal processor designated generally by reference numeral 22 in FIG. 10, and which will next be described.

Referring to the signal processor in detail, FIG. 10, the incoming signal from the receiver, after having been shaped by 84, delivers through conductor 86 pulses to a clock conditioner 88, data detector 96, and an end of data comparitor 90.

The clock conditioner 88 is connected through conductor 410 to a data comparator 94 connected with data memory 70, the purpose of which is to analyze the circuit for the bit characteristics.

The sequence of "1" and "0" is determined by the data detector or NAND gate 96, and this is accomplished by the NAND gate 96 such that an incoming signal, if it has a "0" or "1", will have a timed "1" at the gate 96. If the parallel pulse emanating from the shaper and acting through monostable 308 and R-C circuit 311, 313 produces simultaneously a "1" bit through the circuit 315 to the terminal 317, the terminals 317 and 319 of the NAND gate 96 are simultaneously and identically energized with a "1", and a pulse will next be delivered corresponding to line "d" of FIG. 6. Similarly, the "end of data" NAND gate 90 delivers a pulse along line "C" if incoming signal acting at terminal 321 is a "1" at the same time there occurs a "1" at terminal 323 derived from a pulse obtained from the shaper 302 to monostable 309. The monostable 309 is likewise influenced by an R-C network made up of resistance 325 and capacitor 327.

If the pulses from line "B", clock conditioner 88, pulses from line "C" acting through NAND gate 90 and pulses corresponding to line "D", NAND gate 96, then a combination of these events, after having passed through data comparator 94, which reflect essential pulse characteristics of lines "B", "C", and "D" corresponding with the memory signal, which is the encoded signal corresponding to that transmitted, then the data comparator will "set up", enabling the decision circuit 100 on line "E" to signal that an encoded signal has, in fact, been received.

The decision circuit 100, after having reached the decision of correspondence between the data comparator 94 having the stored signal and the incoming signal, will then enable the decision circuit 100 to deliver a pulse designated by line "E". The pulse "E" delivered by conductor 104 leading to bit authentication circuit 106, will cause the bit authentication circuit 106 to deliver pulse "F" on conductor 112 if the correct number of input pulses from clock conditioner 88 delivered by conductor 110 has confirmed that the incoming signal does, indeed, have the correct number of bits per word. Conductor 110 from clock conditioner 88 is indicated at the upper part of FIG. 10 and leads to the bit authentication circuit 106. The gate circuit 102 will deliver its pulse on line "G" only if it receives a positive decision from decision circuit 100 through conductor 104 and a signal from conductor 112 in the bit authentication circuit 106 indicating the correct number of bits on the detected signal corresponding to the encoded signal from the data memory 70.

The gate circuit 102, after delivering a pulse corresponding to line "G" through conductor 116 to the repeat demand circuit 118, determines whether the signal processor can furnish a second authenticated signal within a time period of approximately 0.2 to 0.8 seconds. The repeat demand circuit 118 consists of a D type flip-flop 402 with an R-C network consisting of resistor 404 and capacitor 406. The R-C circuit 404-406 determines the rejection of signals which are repeated in less than the prescribed time span, and the delay effected by monostable 412 together with R-C circuit network 414,416 determines the rejection of signals which are generated outside the upper limit of the prescribed time span.

The second incoming signal from conductor 116 leads to the monostable 412 and flip-flop 402, with the result that the flip-flop 402 will be energized only if a first authenticated signal has preconditioned the flip-flop and the flip-flop 402 receives a second authenticated signal within the prescribed time span the lower end of which is set by R-C network 404-406 and the upper range of the time span being dictated by the monostable 412 together with its R-C network 414-416. After the repeat demand circuit 118 is satisfied, it will deliver a pulse corresponding to line "H" on conductor 122 to a system controller 120.

The system controller 120 consists of a JK flip-flop 430 with an NPN transistor 432, resistor 434, and PNP transistor 436. The PNP transistor 436 is the switch which controls power to the system 126. Power to terminal 437 is conducted along conductor 438 to the NPN transistor 439 which acts as a regulator to control the signal processor and receiver power supply voltage.

Feedback from the system corresponding to the line 130 also is part of the system, and furnishes a feedback through conductor 130 to the system controller 120. It is a switching network 460 which conditions the signals from the system to the system controller and makes such signals compatible with the system and the system controller. Thus, in the case of an automobile starter, the feedback furnishes feedback information to terminal 442 such as readiness of the automobile for starting, and such other useful parameters by which the system can determine whether it is in condition to receive an actuating signal from the system controller.

INDUSTRIAL APPLICABILITY

Although the present invention has been illustrated and described in connection with a few selected example embodiments, it will be understood that these are illustrative of the invention and are by no means restrictive thereof. It is reasonably to be assumed that those skilled in this art can make numerous revisions and adaptations of the invention and it is intended that such revisions and adaptations of the invention will be included within the scope of the following claims as equivalents of the invention.

The embodiments of the invention in which an exclusive property or privilege is claimed are defined as follows:

1. A method for continuous transmission and digital analysis of relatively weak signal transmissions to determine the pesence of encoded signals within crowded frequency bands and wherein the transmission consists of a duty cycle of primarily continuous "on" transmission, the steps of: transmitting a digital base signal containing pulse width coding, including defined mark points, amplifying said signal transmission within a receiver to greatly amplify the signal transmission together with a substantial background noise within the crowded frequency transmission band, and then processing the amplified signal by the steps of: simultaneously reconstructing the incoming signal data to provide pulse width, word length and bit pattern as parameters for determining the presence of an encoded word, simultaneously submitting reconstructed pulse width, word length and bit pattern data to a data comparator for comparison by a registered signal within the comparator and corresponding to the encoded signal to which the system should be responsive, authenticating the received encoded signal by counting the number of bits in a second encoded signal detected also as having the correct pulse, word length and bit pattern corresponding with that contained within the data memory, and imposing a further requirement that a repeated detection of encoded signal occur within a predetermined time period.

2. A process for controlling a system by an RF coupling characterized by a relatively weak incoming pulse signal to noise ratio, comprising the steps of: shaping and amplifying the incoming pulse signal, simultaneously testing the shaped pulse signal for signal width, word length and signal characteristic for comparison to a prescribed signal within a data memory forming a part of the receiver, actuating as a result of the comparison, a decision circuit responsively to the occurrence of a prescribed signal corresponding to the encoded signal within the data memory, and further testing a successive incoming signal to determine the occurrence of the correct number of bits in the otherwise recognized encoded signal, and thereafter controlling a system through a repeat mechanism by demanding the recurrence of an authenticated signal correspondent with the data memory in the foregoing manner, within a predetermined period of time.

3. A process for controlling a system responsively to an RF coupled transmitter and receiver characterized by a duty cycle of transmission which is primarily continuously "on" and is characterized by a weak developed signal to noise ratio, the steps consisting of: amplifying and shaping an incoming pulse by the receiver, therafter testing the incoming amplified shaped pulse to determine the occurrence of a signal of predetermined pulse width, word length and signal characteristic, and correspondent with a comparator signal of predetermined characteristics, thereafter testing for the occurrence of a second signal for determination of the correct number of bits in the encoded received signal, and thereafter controlling a system through a repeat demand circuit which detects the repeatability of reception of the prescribed signals having the encoded parameters of pulse width, pulse characteristic, word length and bit number within a predetermined period of time.

4. A process for controlling a system through an RF transmitter and receiver characterized by transmission of signals having a low ratio of signal to noise, comprising the steps of: transmitting an encoded signal through a transmitter in which the duty cycle is primarily continuously "on", receiving and then amplifying and shaping the received signal from said transmitter, passing the incoming signals through a clock conditioner, word length detector, and data characteristic detector, to form a reconstructed signal, supplying the parameters in the reconstructed signal of word length, word content and pulse width, simultaneously to a comparator for comparison to a standard encoded signal, energizing a decision circuit upon reception of a signal having the prescribed signal characteristics of signal width, length of word, and word content, authenticating the reception of a properly encoded signal by counting the number of bits in the incoming signal which is determined to have the appropriate signal width, word length and word content, and thereafter controlling a system responsively to the repeatability of an encoded signal in the aforementioned manner within a predetermined period of time.

5. Apparatus for controlling systems by radio control, comprising a transmitter having a duty cycle of primarily continuously "on" transmission and adapted to transmit continuously encoded signals within a crowded frequency band, a sensitive receiver characterized by detecting relatively weak signals within a crowded frequency band and of low signal to noise ratio, amplifying and pulse-shaping means forming a part of said receiver for initializing processing of an incoming signal received by said transmitter, a clock conditioner, duration of data detect means and data detect means for continuously digitally analyzing the pulse-shaped amplified signals, a data comparator including accessible data memory means which is compared with the signal parameters extracted from the signal transmitted by said transmitter by said clock conditioner, duration of data detect means and data detect means, decision circuit means responsive to said amplifying and pulse-shaping means and also to a signal obtained by the occurrence of a match between the signals from said clock conditioner, duration of data, and data detect means with said data memory means, authentication circuit means for measuring the number of bits of a signal determined by said decision circuit as having the appropriate match, and thereafter energizing a gate responsively to the correspondence of appropriate parameters extracted from the signal with the memory signal contained within said comparator, and repeat means for detecting the recurrence of the prescribed signal within a predetermined period of time for actuating a system controller.

6. Apparatus for detecting encoded signals within weak transmissions of crowded frequency bands in an RF coupled transmitter and receiver, such transmitter having a duty cycle of primarily continuously "on", said receiver comprising means for receiving and then amplifying the relatively weak signal together with the background noise, means for shaping the incoming signal, digital processor means for reconstructing the incoming signal data to provide the data of pulse width, word length and bit pattern, means for detecting the occurrence of an encoded signal while obviating statistical error by separately measuring pulse width, word length, and bit pattern, simultaneously sampling incoming signal for bit number to authenticate the occurrence of an encoded signal having the prescribed pulse width, word length, and bit pattern, which are compared with stored signals within a data memory having a predetermined set of signal characteristics and means for repeating the detecting procedure for determining the occurrence of subsequent received signals having the predetermined pulse width, data characteristic, and bit number, and within a predetermined period of time whereby the random reception of the predetermined signal is filtered out.

7. Apparatus for digitally detecting and analyzing a weak radio transmission signal for the occurrence of a predetermined, encoded signal, comprising a combination of clock means, duration of data detect means and data detect means for separately reconstructing pulse width, word length and signal characteristic, means for comparing the separately reconstructed signal parameters for the occurrence of separately reconstructed characteristics correspondent to a prescribed encoded memory characteristic contained within a memory means, and means for repeating the measurement of successively detected signals to determine the repeatability of a prescribed combination of pulse width, word length, and signal characteristic which again corresponds with the memory encoded standard signal and within a predetermined time, to filter out the random occurrence of the prescribed signal which is otherwise occurrable within the statistical error range, and thereby precluding inadvertent operation of a system responsively thereto.

* * * * *